(12) United States Patent
Lee et al.

(10) Patent No.: US 8,611,466 B2
(45) Date of Patent: Dec. 17, 2013

(54) DISCRETE TIME RECEIVER

(75) Inventors: Young-Jae Lee, Daejeon (KR); Byung Hun Min, Daejeon (KR); Nguyen Hoai Nam, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/309,873

(22) Filed: Dec. 2, 2011

(65) Prior Publication Data

US 2012/0170694 A1 Jul. 5, 2012

(30) Foreign Application Priority Data

Dec. 30, 2010 (KR) .................. 10-2010-0139534

(51) Int. Cl.
*H04L 27/00* (2006.01)
(52) U.S. Cl.
USPC ............ 375/316; 375/318; 375/346; 330/252
(58) Field of Classification Search
USPC ........... 375/316, 318, 346, 377; 330/252, 278
See application file for complete search history.

(56) References Cited

U.S. PATENT DOCUMENTS

| | | | |
|---|---|---|---|
| 2007/0111691 A1* | 5/2007 | Hanke et al. | 455/239.1 |
| 2009/0116594 A1 | 5/2009 | Abe et al. | |
| 2009/0191833 A1* | 7/2009 | Kaczman et al. | 455/296 |
| 2009/0310712 A1* | 12/2009 | Nakatani | 375/316 |
| 2010/0231305 A1* | 9/2010 | Mizokami et al. | 330/310 |
| 2011/0182335 A1* | 7/2011 | Pratt et al. | 375/224 |

OTHER PUBLICATIONS

Khurram Muhammad et al., "The First Fully Integrated Quad-Band GSM/GPRS Receiver in a 90-nm Digital CMOS Process", IEEE Journal of Solid-State Circuits, Aug. 2006, p. 1772-1783, vol. 41 No. 8, IEEE.
Rahim Bagheri et al., "An 800-MHz-6-GHz Software-Defined Wireless Receiver in 90-nm CMOS", IEEE Journal of Solid-State Circuits, Dec. 2006, p. 2860-2876, vol. 41 No. 12, IEEE.

* cited by examiner

*Primary Examiner* — Dac Ha

(57) ABSTRACT

Provided is a discrete time receiver having a structure capable of processing various broadband signals. The discrete time receiver uses a discrete time filter having a sampling frequency in a constant range so as to process a signal having an input frequency in a wide range and a wide bandwidth, so that it is possible to reduce current consumption and the area of the discrete time receiver. Since the discrete time receiver is easily integrated with a digital device, it is easy to design a chip using system on chip (SoC).

4 Claims, 5 Drawing Sheets

DISCRETE TIME RECEIVER

CROSS-REFERENCES TO RELATED APPLICATIONS

The present application claims priority under 35 U.S.C. 119(a) to Korean Application No. 10-2010-0139534, filed on Dec. 30, 2010, in the Korean Intellectual Property Office, which is incorporated here in by reference in its entirety set forth in full.

BACKGROUND

Exemplary embodiments of the present invention relate to a discrete time receiver, and more particularly, to a discrete time receiver having a sampling frequency in a constant range so as to process a signal having an input frequency in a wide range and a wide bandwidth.

As the digitization of radio frequency (RF) transceivers is accelerated, existing structures of analog continuous time receivers have recently been developed as structures of digital discrete time receivers. Particularly, as finite impulse response (FIR)/infinite impulse response (IIR) filters and the like, which are frequently used in digital fields, are used in analog fields, there have been proposed various structures or receivers composed of switches and capacitors. The direction of the design of these structures has been developed in relation to the entire structure of receivers including these structures.

Since bandwidths and frequency ranges are varied depending on application, it is required to develop a structure capable of supporting various bands and modes.

Generally, the structure of a continuous time receiver using an analog circuit is widely used in current products. Products using the structure of a discrete time receiver have recently been developed with the trend of digitization by CMOS scaling-down.

However, application fields are limited to a narrow band, and the structure of the discrete time receiver is not applied to various products. The discrete time receiver should process various frequency signals so as to operate in a wide band applicable to various application. It can be applied to specific and various applications with controlling the sampling frequency.

FIG. 1 is a block configuration diagram illustrating a general discrete time receiver.

As illustrated in FIG. 1, the discrete time receiver has a structure of a discrete time filter that operates at a high frequency with a wideband using an RF sampling mixer.

A low noise trans-conductance amplifier (LNTA) 10 is positioned at an input stage. Here, the LNTA 10 performs functions of a low noise amplifier (LNA) and a trans-conductance amplifier (TA).

The LNTA 10 converts a voltage signal into a current signal while amplifying an input signal. The current signal is sampled and decimated in the discrete time filter including a sampling mixer 11, an IIR filter 12, an FIR filter 13 and an IIR filter 14 and then inputted to an analog-to-digital converter (ADC) via a variable amplifier 15.

In the structure described above, the FIR filter 13 performs an anti-aliasing function with various decimation ratios depending on a clock signal inputted thereto, and the IIR filters 12 and 14 remove interferers existing in the vicinity of a desired signal. In the IIR 14 at the rear stage of the FIR filter 13, a capacitor bank is connected to a switch so as to adjust a cutoff frequency. Then, the capacitance of the capacitor bank is changed depending on an operation of the switch, and therefore, the cutoff frequency is changed.

In a case where the dynamic range of the entire receiver is insufficient, the range of a signal detected by the ADC may be narrowed. Hence, the variable amplifier 15 is disposed at the front stage of the ADC so that the signal-to-noise ratio (SNR) of the entire receiver is not decreased.

The structure of the RF receiver has been developed to have a simple form such as soft defined radio (SDR). However, the performance of each block is not sufficient enough to complete the developed structure of the RF receiver, and therefore, it is difficult to perform commercialization.

Therefore, there has been proposed a structure of a discrete time receiver for overcoming such a problem.

The initial structure of the RF receiver was applied to applications including narrowband Bluetooth, wideband code division multiple access (WCDMA) with a narrow bandwidth, and the like. However, as interests has recently been increased in an application field such as long term evolution (LTE) or digital video broadcasting-handheld (DVB-H) with a broad bandwidth, it is required to develop a structure of a digital RF receiver designed so that the structure of the discrete time receiver can process not only a narrowband signal but also a broadband signal.

Also, it is required to develop a structure of a discrete time receiver capable of processing a multi-band and multi-mode signal. In the structure of the discrete time receiver, sampling is performed in an RF field, and the decimation ratio is adjusted according to a sampling frequency, so that an ADC can have a high resolution by decreasing the sampling frequency processed in the ADC as low as possible, and the performance of a discrete time filter used can be tuned according to an input frequency and a bandwidth.

SUMMARY

An embodiment of the present invention relates to a discrete time receiver which has a structure of a receiver capable of processing various wideband signals and uses a discrete time filter having a sampling frequency in a constant range so as to process a signal having an input frequency in a wide range and a wide bandwidth.

In one embodiment, a discrete time receiver includes a radio frequency (RF) front end configured to convert a single signal into a differential signal while amplifying an input signal; an operational transconductance amplifier (OTA) configured to receive an output of the RF front end as an input so as to convert a voltage signal into a current signal, and vary a gain for extending a dynamic range; a mixer configured to receive an output of the OTA; a discrete time filter configured to receive an output signal of the mixer so as to control a decimation ratio depending on a sampling clock; an analog-to-digital converter (ADC) configured to receive an output signal of the discrete time filter so as to convert the received output signal into a digital signal; and a clock interface block configured to provide the mixer, the discrete time filter and the ADC with clocks respectively necessary for the mixer, the discrete time filter and the ADC.

The OTA may include a plurality of OTA cells having different gains, which are connected in parallel and selectively operated.

The discrete time filter may include a current buffer configured to receive the output signal of the mixer and have high input impedance and low output impedance; and a switched capacitor filter (SCF) configured to receive an output signal of the current buffer and control the decimation ratio depending on the sampling clock.

The clock interface block may receive a clock locked through a phase locked loop (PLL) so as to provide a first clock necessary for the mixer, a second clock necessary for the SCF and a third clock necessary for the ADC.

The discrete time receiver may further include a clock synchronization circuit configured to synchronize the third clock with the output signal of the discrete time filter between the ADC and the clock interface block.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Figure 1:
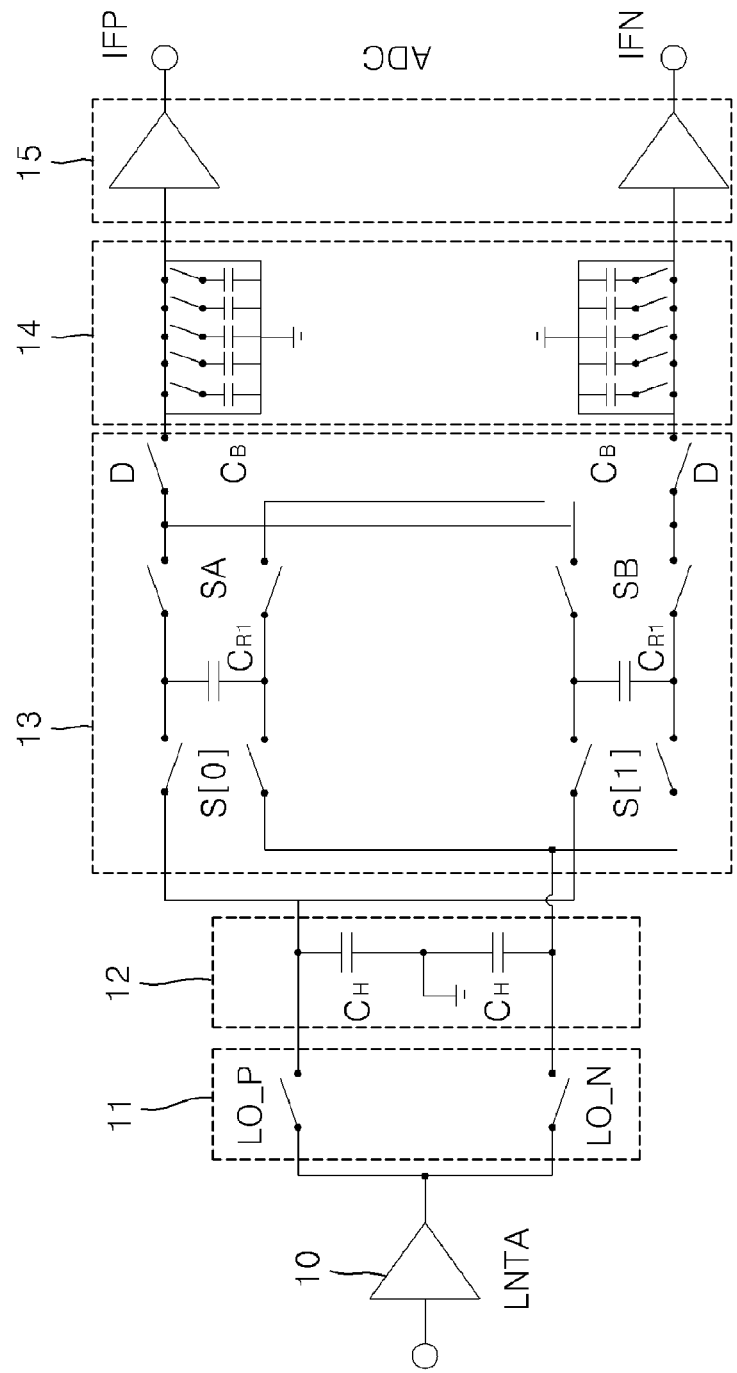
FIG. 1 is a block configuration diagram illustrating a general discrete receiver.
Figure 2:
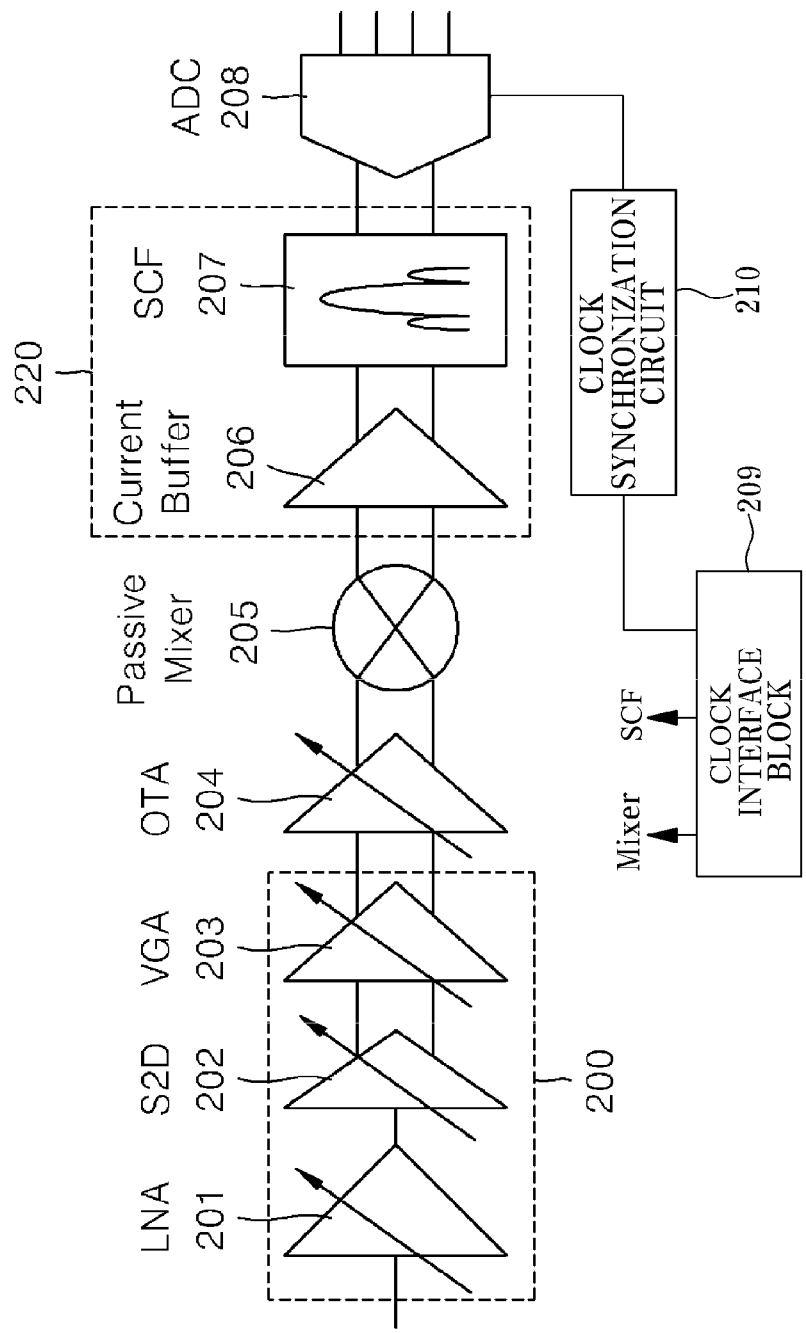
FIG. 2 is a block configuration diagram illustrating a discrete receiver according to an embodiment of the present invention.

FIG. 2 is a block configuration diagram illustrating a discrete receiver according to an embodiment of the present invention.

As illustrated in FIG. 2, the discrete time receiver according to the embodiment of the present invention includes an RF front end 200, an operational transconductance amplifier 204, a mixer 205, a discrete time filter 220, an ADC 208 and a clock interface block 209.

If a voltage signal inputted to the discrete time receiver is converted from a single signal into a differential signal while amplifying the input signal using the RF front end 200 composed of an LNA 201, a single to differential (S2D) 202 and a variable gain amplifier (VGA) 203, the voltage signal is amplified to a differential current signal through the OTA 204, and the amplified differential current signal is frequency-converted into a baseband signal in the passive mixer 205.

A gain variable block for determining a dynamic range is generally performed in the RF front end 200. However, if the gain of the gain variable block is too high, linearity is problematic. Thus, in this embodiment, the gain variable block is configured so that a part of the gain variation can be performed in the OTA 204.

The discrete time filter 220 includes a current buffer 206 and a switched capacitor filter (SCF) 207.

In this case, the current buffer 206 may function to minimize a change in gain by increasing input impedance and decreasing output impedance.

The SCF 207 functions to attenuate a signal outside a band according to the bandwidth of the signal by adjusting a decimation ratio suitable for a sampling clock desired in the ADC 208 and tuning a filter cutoff frequency.

The SCF 207 is configured using one FIR filter, or is configured using a plurality of FIR filters connected in series or parallel so as to obtain optimal filter performance.

The final output of the SCF 207 is directly connected to the ADC 208. In this case, it is required to perform clock synchronization so as not to attenuate the signal. That is, a clock synchronization circuit 210 may be connected to the clock interface block 209 so that the output clock of the SCF 207 can be synchronized with the input clock of the ADC 208. All clocks necessary for these blocks may be provided from the clock interface block 209.

Figure 3:
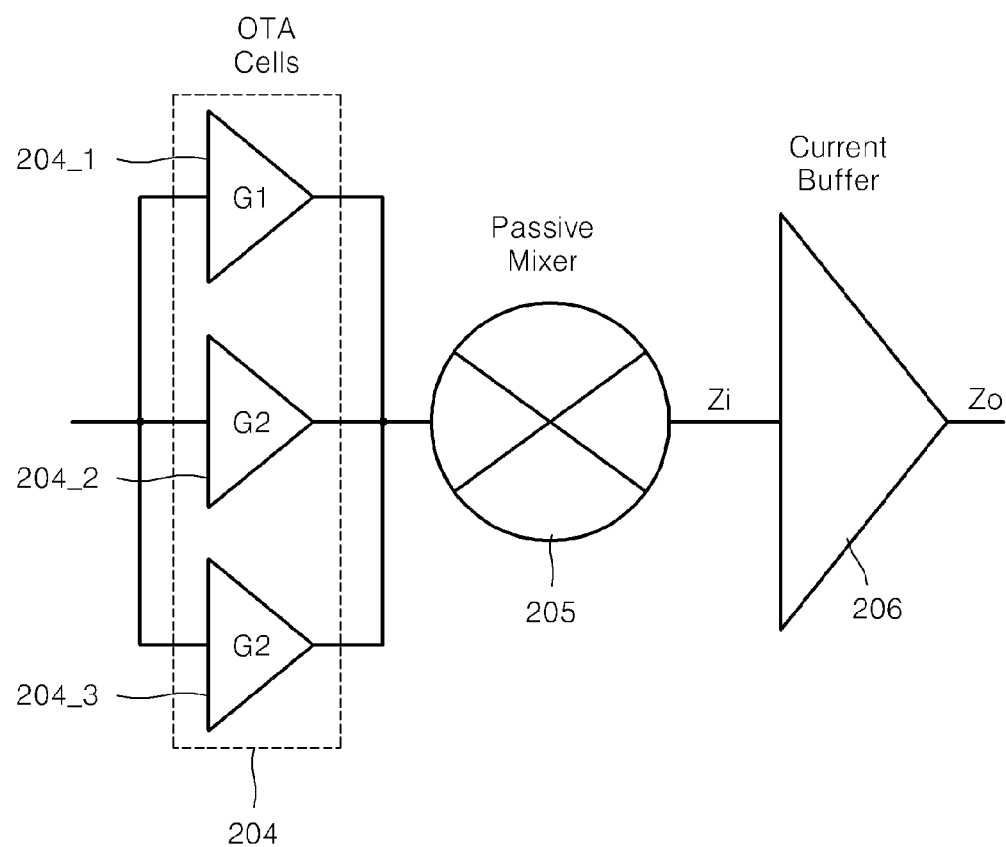
FIG. 3 is a block configuration diagram specifically illustrating the discrete time receiver of FIG. 2.

FIG. 3 is a block configuration diagram specifically illustrating the discrete time receiver of FIG. 2.

As illustrated in FIG. 3, the configuration and connection relation of the OTA 204, the mixer 205 and current buffer 206 in the discrete time receiver will be described in detail.

In this embodiment, a function of varying a gain is added to the OTA 204 so as to broaden the dynamic range.

In order to have a gain while maintaining linearity of the OTA 204, several OTA cells 204_1, 204_2 and 204_3 are connected in parallel, and gains of the OTA cells 204_1, 204_2 and 204_3 are set different from one another. Thus, the gain of the entire OTA 204 is determined by the gain of a selected cell.

The current buffer 206 functions to improve the performance of a filter while maintaining high linearity and having no influence of input/output impedances on the gain. That is, the input impedance Zi may be high and the output impedance Zo is low. Thus, since the current buffer 206 maintains high linearity while maintaining a sufficient dynamic range, the linearity of the entire receiver is determined by the RF front end 200 at the front stage of the current buffer 206, and the rear stage of the current buffer 206 has no influence on the linearity of the entire receiver.

Figure 4:
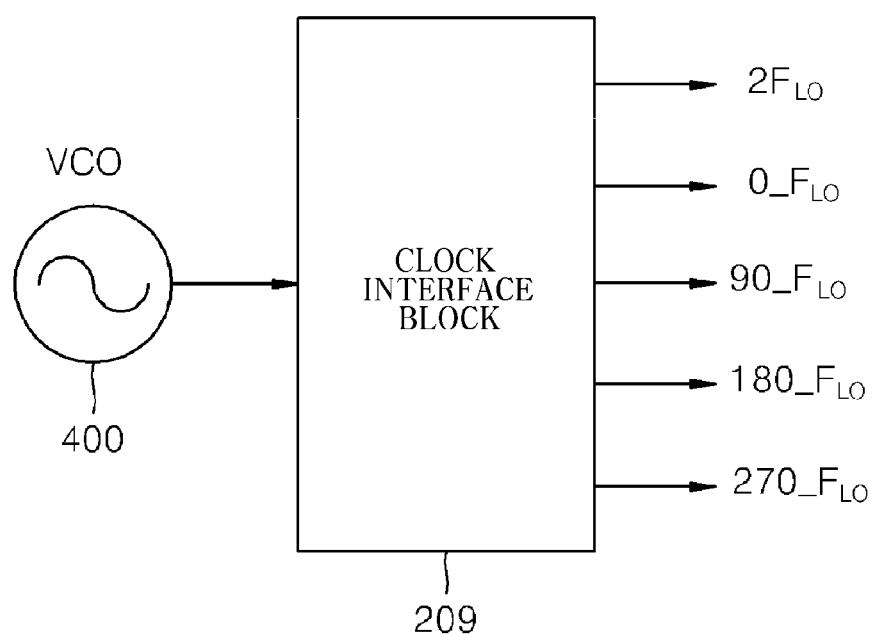
FIG. 4 is a block configuration diagram illustrating a clock interface block for providing a clock to the discrete time receiver of FIG. 2.

FIG. 4 is a block configuration diagram illustrating a clock interface block for providing a clock to the discrete time receiver of FIG. 2.

As illustrated in FIG. 4, a clock generated from a voltage regulating oscillator 400 is inputted to the clock interface block 209 in a locked state through a phase locked loop (PLL).

The clock interface block 209 provides a clock to each of the blocks. Here, the clock has a waveform necessary for each of the blocks. In the discrete time receiver, the blocks requiring clocks are the mixer 205, the SCF 207, and the ADC 208.

Particularly, an I/Q mixer requires I and Q signals. Since the SCF 207 requires various kinds of clocks according to the structure and degree of an FIR filter used, the clock interface block 209 provides a two-time clock and differential I and Q signals to the SCF 207.

Figure 5:
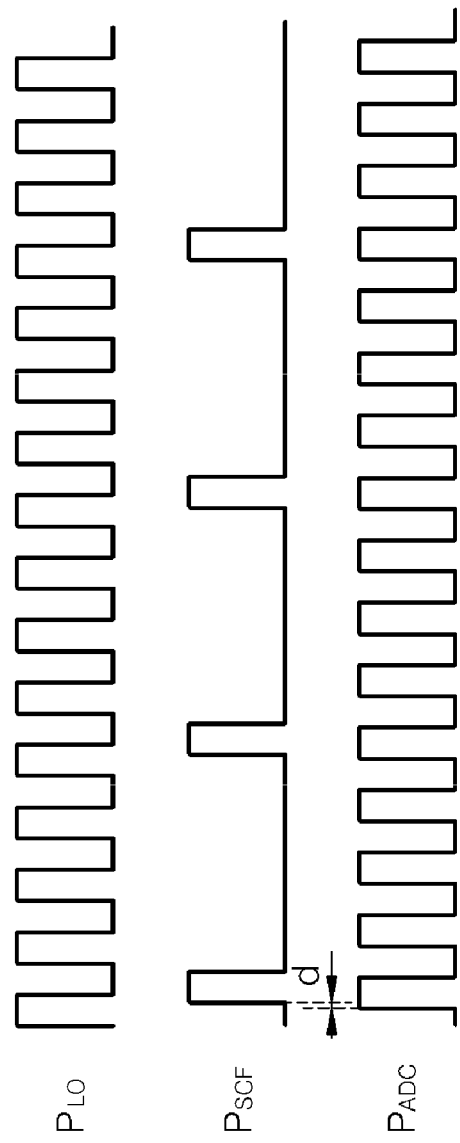
FIG. 5 is a timing diagram illustrating a clock synchronization circuit of the discrete time receiver according to the embodiment of the present invention.

FIG. 5 is a timing diagram illustrating the clock synchronization circuit of FIG. 2.

As illustrated in FIG. 5, $P_{LO}$ is a clock inputted to the mixer 205, and $P_{ADC}$ is a clock inputted to an input terminal of the ADC 208. $P_{SCF}$ is an output signal clock of the SCF 207.

The $P_{ADC}$ and $P_{SCF}$ are exactly synchronized with each other for the purpose of clock synchronization. However, in a practical circuit, a delay d occurs between the $P_{ADC}$ and $P_{SCF}$ due to parasitic capacitance, signal delay and the like. Therefore, the distortion and loss of a signal is prevented through the clock synchronization circuit 210 so as to the delay d. The clock synchronization circuit 210 may input the $P_{SCF}$ to the ADC 208 in the state that the period of an output signal is lengthened under an operation of the SCF 207. If the frequency of the $P_{SCF}$ is changed, the size of the delay d is also changed. Hence, the signal has a sufficient margin.

The discrete time receiver according to the present invention allows not only the RF front end 200 but also OTA 204 to have a gain while maintaining linearity so as to ensure a sufficient dynamic range and linearity. Thus, the discrete time receiver can be applied to various application fields using the discrete time filter. Further, the current buffer 206 is interposed between the mixer 205 and the SCF 207 with respect to a signal inputted to the SCF 207 through the mixer 205, so that it is possible to minimize gain loss.

The clock synchronization circuit 210 for controlling an input clock of the ADC 208 in synchronization with the output signal of the SCF 207 is added to the discrete time receiver, so that the signal inputted to the ADC 208 is synchronized with the output signal of the SCF 207. The ADC 208 converts a clock locked by the PLL into a clock having a desired frequency and duty so as to provide the converted clock to each of the blocks.

The sampling frequency used in the ADC 208 is necessarily in a constant range in consideration of a signal difference to noise ratio (SDNR). The sampling frequency is controlled to be in the constant range by the clock interface block 209.

As described above, the discrete time receiver according to the present invention can process a signal having an input frequency in a wide range and a wide bandwidth.

Also, the gain of an OTA is controlled, so that it is possible to maintain linearity while maintaining a wide dynamic range.

Also, a current buffer is used, so that it is possible to prevent attenuation of a signal inputted to an SCF.

Also, a signal inputted to an ADC is synchronized with a clock of the ADC, so that it is possible to minimize loss of the signal inputted to the ADC.

Also, it is possible to reduce current consumption and the area of the discrete time receiver. Since the discrete time receiver is easily integrated with a digital device, it is easy to design a chip using system on chip (SoC).

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A discrete time receiver, comprising:
    a radio frequency (RF) front end configured to convert a single signal into differential signals and amplify the differential signals;
    an operational transconductance amplifier (OTA) configured to receive a voltage signal output from the RF front end, convert the voltage signal into a current signal, and vary a gain to extend a dynamic range;
    a mixer configured to receive an output signal of the OTA and frequency-convert the received signal into a baseband signal;
    a discrete time filter configured to receive an output signal of the mixer and control a decimation ratio based on a sampling clock;
    an analog-to-digital converter (ADC) configured to receive an output signal of the discrete time filter and convert the received output signal into a digital signal;
    a clock interface block configured to provide the mixer, the discrete time filter, and the ADC with clocks, respectively; and
    a clock synchronization circuit coupled to and disposed between the ADC and the clock interface block and configured to synchronize a clock input to the ADC, which is output from the clock interface block, with the output signal of the discrete time filter.

2. The discrete time receiver of claim 1, wherein the OTA comprises a plurality of OTA cells having different gains, the plurality of OTA cells being coupled in parallel and operating selectively.

3. The discrete time receiver of claim 1, wherein the discrete time filter comprises:
    a current buffer configured to receive the output signal of the mixer, the current buffer having high input impedance and low output impedance; and
    a switched capacitor filter (SCF) configured to receive an output signal of the current buffer and control the decimation ratio based on the sampling clock.

4. The discrete time receiver of claim 1, wherein the clock interface block is configured to receive a clock locked through a phase locked loop (PLL) and provide a first clock necessary to the mixer, a second clock necessary to the SCF, and a third clock necessary to the ADC.

* * * * *